US011272136B2

(12) United States Patent
Liu

(10) Patent No.: US 11,272,136 B2
(45) Date of Patent: Mar. 8, 2022

(54) METHOD AND DEVICE FOR PROCESSING MULTIMEDIA INFORMATION, ELECTRONIC EQUIPMENT AND COMPUTER-READABLE STORAGE MEDIUM

(71) Applicant: BEIJING MICROLIVE VISION TECHNOLOGY CO., LTD, Beijing (CN)

(72) Inventor: Deping Liu, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/010,442

(22) Filed: Sep. 2, 2020

(65) Prior Publication Data
US 2020/0413003 A1    Dec. 31, 2020

Related U.S. Application Data

(63) Continuation of application No. PCT/CN2018/125421, filed on Dec. 29, 2018.

(30) Foreign Application Priority Data

Dec. 25, 2018  (CN) .......................... 201811593134.3

(51) Int. Cl.
*H04N 5/92*  (2006.01)
*G10H 1/36*  (2006.01)
(Continued)

(52) U.S. Cl.
CPC .......... *H04N 5/9202* (2013.01); *G10H 1/361* (2013.01); *G11B 27/031* (2013.01); *H04N 5/262* (2013.01)

(58) Field of Classification Search
CPC ...... H04N 5/9202; H04N 5/262; G10H 1/361; G11B 27/031
See application file for complete search history.

(56) References Cited

U.S. PATENT DOCUMENTS 10,001,968 B1 *  6/2018  Slick ....................... G06F 3/165
2009/0245542 A1 * 10/2009  Vasinkevich .......... H04H 60/22
                                                          381/122

(Continued)

FOREIGN PATENT DOCUMENTS

CN    102568527 A    7/2012
CN    103686450 A    3/2014
(Continued)

OTHER PUBLICATIONS

International Patent Application No. PCT/CN2018/125421; Int'l Search Report; dated Sep. 27, 2019; 2 pages.

*Primary Examiner* — Mishawn N. Hunter
(74) *Attorney, Agent, or Firm* — BakerHostetler

(57) ABSTRACT

The present application discloses a method and device for processing multimedia information, an electronic equipment, and a computer-readable storage medium. The method for processing multimedia information includes: detecting whether multimedia configuration parameters have changed during a process of recording multimedia information; and recording the multimedia information based on the changed multimedia configuration parameters when detecting that the multimedia configuration parameters have changed. According to the embodiments of the present application, multimedia configuration parameters of the special effects such as stickers, make-up, filters, and mixing can be added during the recording of multimedia information, which improves the user experience.

20 Claims, 4 Drawing Sheets editing lyrics information of a track based on an instruction received from the user; recording multimedia information based on the track selected by a user and at least one parameter selected by the user; receiving user input during a process of recording the multimedia information; determining whether the at least one parameter is changed during the process of recording the multimedia information based on the user input — S110 recording a subsequent part of the multimedia information based on the changed at least one parameter, and editing the recorded multimedia information based on another instruction received from the user — S120

(51) Int. Cl.
*G11B 27/031* (2006.01)
*H04N 5/262* (2006.01)

(56) References Cited

U.S. PATENT DOCUMENTS

| | | | |
|---|---|---|---|
| 2012/0017150 A1* | 1/2012 | Pollack | G11B 27/034 |
| | | | 715/716 |
| 2015/0005041 A1 | 1/2015 | Lim et al. | |
| 2017/0257414 A1* | 9/2017 | Zaletel | G06F 16/252 |
| 2018/0012077 A1* | 1/2018 | Laska | G11B 27/028 |
| 2018/0061010 A1* | 3/2018 | Akselrod | G06K 9/00228 |
| 2019/0294825 A1* | 9/2019 | Frederick | H04N 21/835 |

FOREIGN PATENT DOCUMENTS

| | | |
|---|---|---|
| CN | 104811787 A | 7/2015 |
| CN | 105898364 A | 8/2016 |
| CN | 106339201 A | 1/2017 |
| CN | 106534775 A | 3/2017 |
| CN | 106558299 A | 4/2017 |
| CN | 106657814 A | 5/2017 |
| CN | 106658219 A | 5/2017 |
| CN | 106804005 A | 6/2017 |
| CN | 106937129 A | 7/2017 |
| CN | 107071512 A | 8/2017 |
| CN | 108900768 A | 11/2018 |
| CN | 109587549 A | 4/2019 |
| JP | 2000-307627 A | 11/2000 |

\* cited by examiner

METHOD AND DEVICE FOR PROCESSING MULTIMEDIA INFORMATION, ELECTRONIC EQUIPMENT AND COMPUTER-READABLE STORAGE MEDIUM

CROSS-REFERENCE TO RELATED APPLICATION

The present disclosure is a continuation of PCT International Application No. PCT/CN2018/125421, filed on Dec. 29, 2018, which claims priority of a Chinese patent application No. 201811593134.3, filed on Dec. 25, 2018 in the State Intellectual Property Office of China, the disclosure of which is incorporated by reference herein in its entirety.

TECHNICAL FIELD

The present application relates to the technical field of multimedia information processing, and in particular, the present application relates to a method and a device for processing multimedia information, an electronic equipment, and a computer-readable storage medium.

BACKGROUND ART

With the increasing demand for entertainment and leisure, multimedia data products such as audio and video are becoming more and more abundant. The client that provides music playing, song recording and other services is one of them. The client is a combination of music player and recording software. Through the client, not only the original song can be played, but also the user's song can be recorded, and the recorded song can be uploaded to the network so that more people can hear their own song.

Although the existing client can provide the recording service of multimedia information, it cannot arbitrarily change or add the multimedia configuration parameters such as stickers, beauties, filters, mixing and the like in the process of recording multimedia information, resulting in the inability to provide users with richer multimedia information recording choices and poor user experience.

SUMMARY OF THE INVENTION

In a first aspect, the present application provides a method for processing multimedia information, including the following steps of:

detecting whether multimedia configuration parameters have changed during a process of recording multimedia information; and recording the multimedia information based on the changed multimedia configuration parameters when detecting that the multimedia configuration parameters have changed.

The multimedia configuration parameters include at least one of the following:

configuration parameters of scene-type information, configuration parameters of additional information corresponding to facial features, configuration parameters of additional information corresponding to limbs, configuration parameters of mixing information, and configuration parameters of playback mode.

The configuration parameters of scene-type information include at least one of the following: configuration parameters of filter information and configuration parameters of background environment information.

Further, the step of recording of multimedia information includes:

recording the multimedia information based on a track currently selected by a user and the multimedia configuration parameters, the track includes song information and lyrics information.

Further, the step of recording the multimedia information based on the changed multimedia configuration parameters when detecting that the multimedia configuration parameters have changed includes:

playing the song information according to the changed playback mode, when detecting that the configuration parameters of the playback mode have changed, and recording the multimedia information based on the changed configuration parameters of the playback mode, the configuration parameters of the playback mode include any of the following:

configuration parameters of accompaniment mode, configuration parameters of original vocal mode, and configuration parameters of earphone monitor mode.

Further, the step of recording the multimedia information based on the changed multimedia configuration parameters when detecting that the multimedia configuration parameters have changed includes:

playing the song information based on the configuration parameters of mixing mode, when detecting that the configuration parameters of mixing mode have changed, and recording the multimedia information based on the changed configuration parameters of the mixing mode, the configuration parameters of mixing information include any one of the following:

configuration parameters of rock mode, configuration parameters of folk mode, configuration parameters of classical mode, configuration parameters of country mode, configuration parameters of jazz mode, configuration parameters of popular mode and configuration parameters of hip-hop mode.

Further, before the step of recording the multimedia information based on a track currently selected by a user and the multimedia configuration parameters, the method further includes:

receiving a lyrics editing instruction input by the user, and editing the lyrics information according to the lyrics editing instruction;

wherein the step of recording the multimedia information based on the track currently selected by the user and the multimedia configuration parameters includes:

recording the multimedia information based on the edited lyrics information, the song information corresponding to the edited lyrics information, and the multimedia configuration parameters.

Further, after the step of recording the multimedia information based on the changed multimedia configuration parameters, the method further includes:

receiving a multimedia editing instruction input by the user, and editing the recorded multimedia information according to the multimedia editing instruction to obtain the edited multimedia information.

Further, the multimedia information includes video information captured by the user processed according to the multimedia configuration parameters, song information, lyrics information, and audio information corresponding to the track input by the user.

In a second aspect, the present application provides a device for processing multimedia information, including:

a detection module, configured to detect whether multimedia configuration parameters have changed during a process of recording multimedia information;

a recording module, configured to record the multimedia information based on the changed multimedia configuration parameters when detecting that the multimedia configuration parameters have changed.

Further, the multimedia configuration parameters include at least one of the following:

configuration parameters of scene-type information, configuration parameters of additional information corresponding to facial features, configuration parameters of additional information corresponding to limbs, configuration parameters of mixing information, and configuration parameters of playback mode;

the configuration parameters of scene-type information include at least one of the following: configuration parameters of filter information and configuration parameters of background environment information.

Further, the recording module is configured to record the multimedia information based on a track currently selected by a user and the multimedia configuration parameters, the track includes song information and lyrics information.

Further, the recording module is configured to: play the song information according to the changed playback mode, when detecting that the configuration parameters of playback mode have changed, and record the multimedia information based on the changed configuration parameters of the playback mode, the configuration parameters of the playback mode include any of the following:

configuration parameters of accompaniment mode, configuration parameters of original vocal mode, and configuration parameters of earphone monitor mode.

Further, the recording module is configured to: play the song information based on the configuration parameters of mixing mode, when detecting that the configuration parameters of mixing mode have changed, and record the multimedia information based on the changed configuration parameters of the mixing mode, the configuration parameters of mixing information include any one of the following:

configuration parameters of rock mode, configuration parameters of folk mode, configuration parameters of classical mode, configuration parameters of country mode, configuration parameters of jazz mode, configuration parameters of popular mode and configuration parameters of hip-hop mode.

Further, the device further includes a first editing module, which is configured to receive a lyrics editing instruction input by the user, and edit the lyrics information according to the lyrics editing instruction;

wherein, the recording module is configured to record the multimedia information based on the edited lyrics information, song information corresponding to the edited lyrics information, and the multimedia configuration parameters.

Further, the device further includes a second editing module, which is configured to receive a multimedia editing instruction input by the user, and edit the recorded multimedia information according to the multimedia editing instruction to obtain the edited multimedia information.

Further, the multimedia information includes video information captured by the user processed according to the multimedia configuration parameters, song information, lyrics information, and audio information corresponding to the track input by the user.

In a third aspect, the present application provides an electronic equipment including a memory and a processor. A computer program is stored on the memory, and when the computer program is executed by the processor, the above-mentioned method for processing multimedia information is implemented.

In a fourth aspect, the present application provides a computer-readable storage medium. A computer program is stored on the computer-readable storage medium, and when the computer program is executed by a computer, the above-mentioned method for processing multimedia information is implemented.

The embodiment of the present application enables the user to not only add multimedia configuration parameters of some special effects such as stickers, make-up, filters, and mixing during the process of recording the multimedia information, but also change the selected multimedia configuration, so as to record the multimedia information processed according to the multimedia configuration parameters, thereby improving the user experience.

Additional aspects and advantages of the present application will be given in part in the following description, which will become apparent from the following description, or will be understood by practice of the present application.

THE DESCRIPTION OF DRAWINGS

The above and/or additional aspects and advantages of the present application will become apparent and readily understood from the following description of embodiments taken in conjunction with the accompanying drawings, in which.

DETAILED DESCRIPTION OF THE PREFERRED EMBODIMENT

Figure 1:
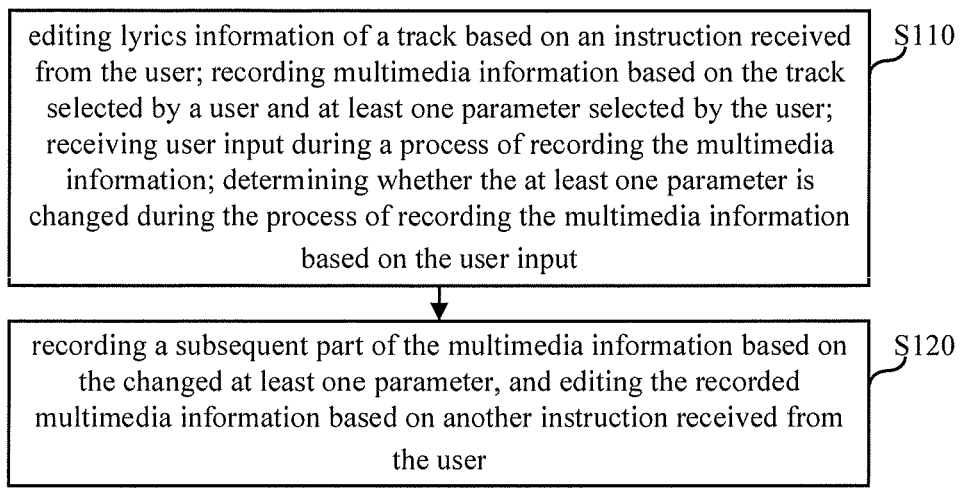
FIG. 1 is a schematic flowchart of a method for processing multimedia information according to an embodiment of the present application.

Embodiments of the present application are described in detail below, examples of which are illustrated in the accompanying drawings, wherein the same or similar reference numerals refer to the same or similar elements or elements having the same or similar functions throughout. The embodiments described below by referring to the drawings are exemplary and are only for the purpose of explaining the present application and are not to be construed as limiting the present application.

It should be understood by one person of ordinary skill in the art that singular forms "a", "an", "the" and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein may include wireless connection or wireless coupling. As used herein, the term "and/or" includes all or any of one or more associated listed items or combinations thereof.

To make the objectives, technical solutions, and advantages of the present application clearer, the embodiments of the present application will be described in further detail below in conjunction with the accompanying drawings.

The following specifically describes the technical solution of the present application and how the technical solution of the present application solves the foregoing technical problems in specific embodiments. The following specific embodiments may be combined with each other, and the same or similar concepts or processes may not be repeated in some embodiments. The embodiments of the present application will be described below with reference to the drawings.

Embodiment 1

An embodiment of the present application provides a method for processing multimedia information. As shown in FIG. 1, the method includes:

Step S110: editing lyrics information of a track based on an instruction received from the user; recording multimedia information based on the track selected by a user and at least one parameter selected by the user; receiving user input during a process of recording the multimedia information; determining whether the at least one parameter is changed during the process of recording the multimedia information based on the user input.

Specifically, the user can record multimedia information through the corresponding client. During the process of recording multimedia information through a client, the user can change, adjust or add multimedia configuration parameters at any time, that is, configuring the configuration parameters of the multimedia information. Correspondingly, the client detects whether the multimedia configuration parameters have changed during the process of recording multimedia information. Wherein, the process of recording the multimedia information may be a karaoke recording process.

Step S120, recording a subsequent part of the multimedia information based on the changed at least one parameter, and editing the recorded multimedia information based on another instruction received from the user.

Specifically, when the client detects that the multimedia configuration parameters have changed, it indicates that the user has readjusted the originally configured multimedia configuration parameters or added new multimedia configuration parameters that have not been used before. At this time, the client records multimedia information based on the changed multimedia configuration parameters.

The embodiment of the present application enables the user to not only add multimedia configuration parameters of some special effects such as stickers, make-up, filters, and mixing during the process of recording the multimedia information, but also change the selected multimedia configuration, so as to record the multimedia information processed according to the multimedia configuration parameters, thereby improving the user experience.

The embodiment of the present application provides another possible implementation, wherein:

the multimedia configuration parameters include at least one of the following:

configuration parameters of scene-type information, configuration parameters of additional information corresponding to facial features, configuration parameters of additional information corresponding to limbs, configuration parameters of mixing information, and configuration parameters of playback mode;

the configuration parameters of scene-type information include at least one of the following: configuration parameters of filter information and configuration parameters of background environment information.

Further, the recording of multimedia information includes:

recording the multimedia information based on a track currently selected by a user and the multimedia configuration parameters, the track includes song information and lyrics information.

Further, recording the multimedia information based on the changed multimedia configuration parameters when detecting that the multimedia configuration parameters have changed includes:

when detecting that the configuration parameters of playback mode have changed, playing the song information according to the changed playback mode, and recording the multimedia information based on the changed configuration parameters of the playback mode, the configuration parameters of the playback mode include any of the following:

configuration parameters of accompaniment mode, configuration parameters of original vocal mode, and configuration parameters of earphone monitor mode.

Further, recording the multimedia information based on the changed multimedia configuration parameters when detecting that the multimedia configuration parameters have changed includes:

when detecting that the configuration parameters of mixing mode have changed, playing the song information based on the configuration parameters of mixing mode, and recording the multimedia information based on the changed configuration parameters of the mixing mode, the configuration parameters of mixing information include any one of the following:

configuration parameters of rock mode, configuration parameters of folk mode, configuration parameters of classical mode, configuration parameters of country mode, configuration parameters of jazz mode, configuration parameters of popular mode and configuration parameters of hip-hop mode.

Further, the multimedia information includes video information captured by the user processed according to the multimedia configuration parameters, song information, lyrics information, and audio information corresponding to the track input by the user.

The method for processing multimedia information in this implementation is described in detail below:

Specifically, the recorded multimedia information not only includes the song information and lyrics information, but also includes video information captured by the user processed according to multimedia configuration parameters and audio information corresponding to the track input by the user, that is, the recorded multimedia information is an audio/video similar to MV (Music Video), in which the client can mix the audio information (such as the singing corresponding to the track sung by the user) corresponding to the track input by the user with the above played first song information, that is, infusing the user's own singing into the played first song information.

Further, no matter before the multimedia information is recorded, or during the process of recording the multimedia information, the user can select the track and the multimedia configuration parameters, and record the multimedia information through the client according to the selected track and the multimedia configuration parameters. Correspondingly, the multimedia information is recorded to the client based on the acquired track selected by the user and multimedia configuration parameters.

Wherein, during the process of recording multimedia information, the user can select corresponding multimedia configuration parameters through operations such as adjustment, switching, or selection of multimedia configuration parameters. For example, the multimedia configuration parameters corresponding to facial features can be adjusted by switching the multimedia configuration parameters corresponding to facial features. For another example, the multimedia configuration parameters corresponding to limbs can be adjusted by switching the multimedia configuration parameters corresponding to limbs. Still for another example, by triggering multimedia configuration parameters of scene-type information (such as filter information, background environment information, etc.), multimedia filter parameters or background environment selection parameters are adjusted.

Further, during the process of playing the first song information, the client may dynamically adjust the display color and/or size of each word in the lyrics information corresponding to the current playing time according to the current playing time of the first song information, for example, increasing the overall font size of a certain lyrics corresponding to the current playing time of the song information by one font size or two font sizes, etc., and for another example, according to the playing melody, coloring the word of a certain lyrics corresponding to the current playing time of the first song information word-by-word, that is, adjusting the display color of each word in a certain lyrics, for example, the unsung words are displayed in gray, and the sung words are adjusted to red or blue to improve the user experience.

Further, during the process of recording multimedia information, the user may change the configuration parameters of the playback mode among the configuration parameters of the accompaniment mode, the configuration parameters of the original vocal mode, and the configuration parameters of the earphone monitor mod. Wherein, the user can switch to the playback mode by inputting a playback mode switching instruction. For example, the user can switch the playback of song information to the accompaniment mode by touching the accompaniment mode. For another example, the user can switch the playback of song information to the original vocal mode by touching the original vocal mode. Correspondingly, when the client detects that the configuration parameters of the playback mode are changed, the client plays the song information according to the changed playback mode, and records multimedia information based on the changed configuration parameters of the playback mode.

Further, during the process of recording multimedia information, the user can also pause the playback of song information and the recording of multimedia information by touching the "pause" button, wherein when the client detects a pause playback instruction input by the user, the playback of song information is stopped, and the recording of multimedia information is also stopped, while displaying identification information related to the configuring of the multimedia configuration parameters such as "flip camera", "make-up", "sticker" on the client interface for the user to select the corresponding multimedia configuration parameters, or for the user to change the original multimedia configuration parameters. After the user selects or changes the multimedia configuration parameters, or when the multimedia configuration parameters are not selected, the user can continue recording multimedia information by touching the touch button "continue". Wherein, when the user touches the touch button "continue" to continue recording multimedia information, the additional information (such as "flip camera", "make-up", and "sticker") displayed when the client interface is in a paused state is hidden. Meanwhile, the recording of the multimedia information based on the multimedia configuration parameters is continued.

It should be noted that when the client receives the instruction to continue playing input by the user, (1) if it detects that the multimedia configuration parameters have changed, the multimedia information is recorded based on the changed multimedia configuration parameters. At this time, the client continues playing song information and synchronously record the multimedia information including lyrics information, song information, video information captured by the user processed according to the switched multimedia configuration parameters, and audio information corresponding to the track input by the user. (2) If the client detects that the multimedia configuration parameters have not changed, it will continue recording the multimedia information including the video information captured by the user processed according to the original multimedia configuration parameters, song information, lyrics information and audio information corresponding to the track input by the user. That is, the multimedia configuration parameters of the multimedia information recorded at this time are the same as those of the multimedia information recorded before the pause.

Further, during the process of recording multimedia information, the user may also insert headphones into the earphone hole of the terminal equipment as needed, that is, to listen to the song information being played in the earphone mode, and simultaneously record the multimedia information. Wherein, when the client detects the access of the earphone device, a trigger button for configuration parameters of mixing information may be provided, such that the user can select the configuration parameters of a target reverb mode through the trigger button for configuration parameters of mixing information, such as configuration parameters of rock mode, configuration parameters of folk mode, configuration parameters of classical mode, configuration parameters of country mode, configuration parameters of jazz mode, configuration parameters of popular mode and configuration parameters of hip-hop mode and the like. Of course, it can also be configuration parameters of other modes, which is not limited in the embodiment of the present application.

Further, if the user selects the configuration parameters of the rock mode through the trigger button for configuration parameters of mixing information, the client plays the song information according to the configuration parameters of rock mode, and simultaneously records the multimedia information including lyrics information, song information played in the rock mode, video information captured by the user processed according to the multimedia configuration parameters, and audio information corresponding to the track input by the user. If the user selects the configuration parameters of the jazz mode through the reverb function trigger button, the client plays the song information according to the configuration parameters of the jazz mode, and simultaneously records the multimedia information including lyrics information, song information played according to the configuration parameters of the jazz mode, video information captured by the user processed according to the multimedia configuration parameters, and audio information corresponding to the track input by the user.

For this implementation, through the switching of the configuration parameters of the playback mode and the switching or triggering of the configuration parameters of mixing mode, during the process of recording multimedia information, the user can record more colorful multimedia information as needed, which meets the diversity of user requirements and improve user experience.

The embodiment of the present application provides another possible implementation, wherein:

After step S120, step S121 is also included (not shown in the figure): receiving the lyrics editing instruction input by the user, and editing the lyrics information according to the lyrics editing instruction.

Specifically, after displaying the lyrics information of the track of the multimedia information to be recorded on the client, the user can edit the displayed lyrics information through the lyrics editing instruction according to the user's own needs, for example, all the lyrics should be original displayed starting from the first sentence of the lyrics is edited through the lyrics editing instruction into the lyrics information to be displayed starting from the fifth sentence of the lyrics, or for another example, all the lyrics information originally displayed starting from the first sentence of the lyrics is edited into the lyrics information to be displayed starting from the seventh sentence to the tenth sentence of the lyrics.

Further, when the client edits the lyrics information according to the lyrics editing instruction, when the song information is played and the multimedia information is recorded synchronously, the client will perform the adaptive adjustment according to the lyrics editing instruction, that is, it is adjusted to play the song information corresponding to the edited lyrics information, and record the multimedia information based on the edited song information, edited lyrics information and the multimedia configuration information synchronously. That is, if the user inputs a lyrics editing instruction, the client only plays the song information corresponding to the lyrics information edited according to the lyrics editing instruction, and during the recording process, the multimedia information including the video information captured by the user processed according to the multimedia configuration parameters, the edited song information, the edited lyrics information and audio information corresponding to the edited track input by the user are all synchronously recorded.

For this implementation, the user's personalized needs are further satisfied by the lyrics editing instruction, and the resources consumed in the process of recording multimedia information are saved by the lyrics editing.

The embodiment of the present application provides another possible implementation, wherein:

After step S130, step S140 (not shown in the figure) is further included: receiving a multimedia editing instruction input by the user, and editing the recorded multimedia information according to the multimedia editing instruction to obtain the edited multimedia information.

Specifically, after the client finishes recording the multimedia information, the user can edit the recorded multimedia information by inputting a multimedia editing instruction as needs, so as to obtain the multimedia information that the user is satisfied with. Wherein the edited multimedia information only includes song information that matches the editing instruction, lyrics information, video information captured by the user processed according to the multimedia configuration parameters, and audio information corresponding to the track input by the user, that is, when the user clicks to play the edited multimedia information, only part of the multimedia information that matches the user's editing instruction will be played.

Further, after the user obtains the multimedia information that the user is satisfied with, the user can save it locally, share it with friends, or publish it to the Internet for everyone to enjoy.

For this implementation, the user's personalized needs are further satisfied through the multimedia editing instruction, and the user experience is improved.

Embodiment 2

Figure 2:
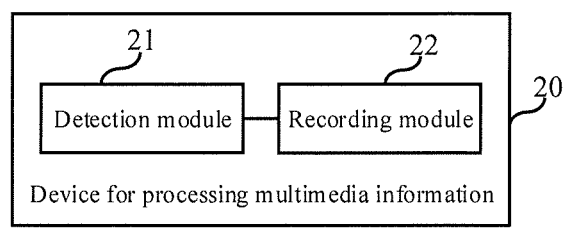
FIG. 2 is a schematic diagram of a basic structure of a device for processing multimedia information according to an embodiment of the present application.

FIG. 2 is a schematic diagram of a basic structure of a device for processing multimedia information according to an embodiment of the present application. As shown in FIG. 2, the device 20 may include a detection module 21 and a recording module 22, wherein:

the detection module 21 is configured to detect whether multimedia configuration parameters have changed during a process of recording multimedia information;

the recording module 22 is configured to record the multimedia information based on the changed multimedia configuration parameters when detecting that the multimedia configuration parameters have changed.

Figure 3:
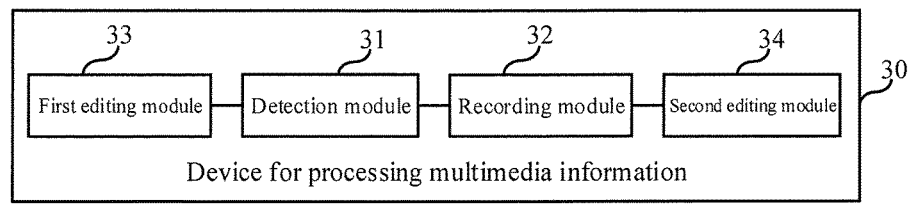
FIG. 3 is a detailed structural diagram of a device for processing multimedia information according to an embodiment of the present application.

Specifically, FIG. 3 is a detailed structural diagram of a device for processing multimedia information according to an embodiment of the present application. The device 30 may include a detection module 31, a recording module 32, a first editing module 33, and a second editing module 34. Wherein, the functions implemented by the detection module 31 in FIG. 3 are the same as those of the detection module 21 in FIG. 2, and the functions implemented by the recording module 32 in FIG. 3 are the same as those of the recording module 22 in FIG. 2, which are not described herein again.

The device for processing multimedia information shown in FIG. 3 is described in detail below.

The multimedia configuration parameters include at least one of the following:

configuration parameters of scene-type information, configuration parameters of additional information corresponding to facial features, configuration parameters of additional information corresponding to limbs, configuration parameters of mixing information, and configuration parameters of playback mode.

The configuration parameters of scene-type information include at least one of the following: configuration parameters of filter information and configuration parameters of background environment information.

Further, the recording module 32 is configured to record the multimedia information based on a track currently selected by a user and the multimedia configuration parameters, the track includes song information and lyrics information.

Further, the recording module 32 is configured to: when detecting that the configuration parameters of playback mode have changed, play the song information according to the changed playback mode, and record the multimedia information based on the changed configuration parameters of the playback mode, the configuration parameters of the playback mode include any of the following:

configuration parameters of accompaniment mode, configuration parameters of original vocal mode, and configuration parameters of earphone monitor mode.

Further, the recording module 32 is configured to play the song information based on the configuration parameters of mixing mode, when detecting that the configuration parameters of mixing mode have changed, and record the multimedia information based on the changed configuration parameters of the mixing mode, the configuration parameters of mixing information include any one of the following:

configuration parameters of rock mode, configuration parameters of folk mode, configuration parameters of classical mode, configuration parameters of country mode, configuration parameters of jazz mode, configuration parameters of popular mode and configuration parameters of hip-hop mode.

Further, the first editing module 33 is configured to receive a lyrics editing instruction input by the user, and edit the lyrics information according to the lyrics editing instruction;

wherein, the recording module 32 is configured to record the multimedia information based on the edited lyrics information, song information corresponding to the edited lyrics information, and the multimedia configuration parameters.

Further, the second editing module 34 is configured to receive a multimedia editing instruction input by the user, and edit the recorded multimedia information according to the multimedia editing instruction to obtain the edited multimedia information.

Further, the multimedia information includes video information captured by the user processed according to the multimedia configuration parameters, song information, lyrics information, and audio information corresponding to the track input by the user.

Embodiment 3

Figure 4:
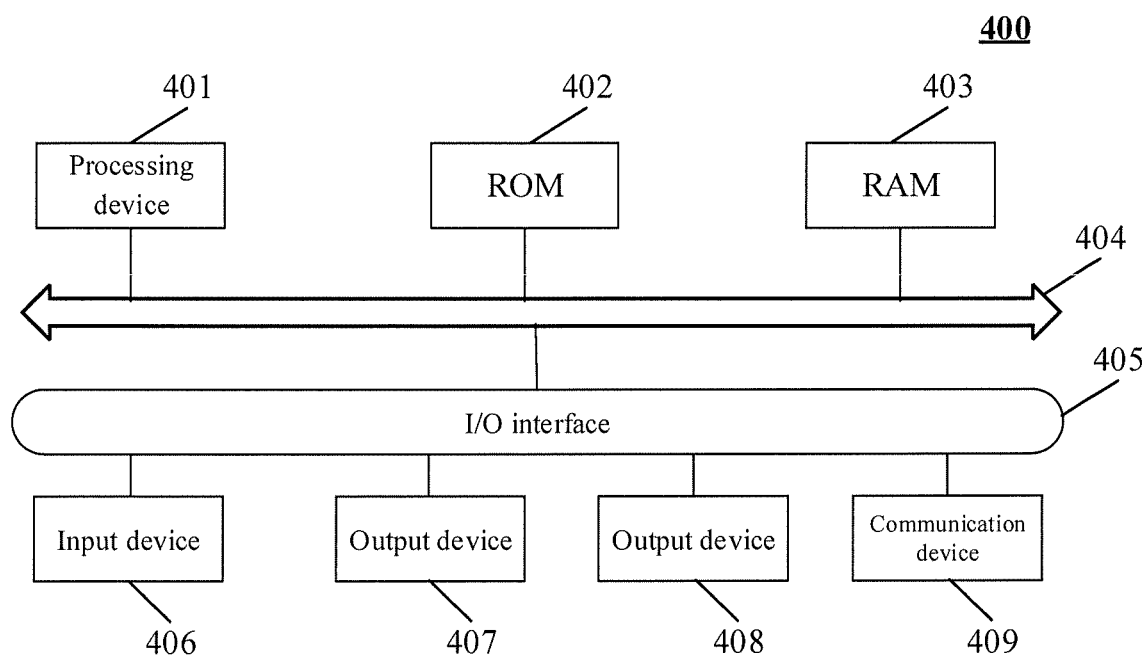
FIG. 4 is a schematic structural diagram of an electronic equipment according to an embodiment of the present application.

Reference is now made to FIG. 4, which illustrates a schematic structural diagram of an electronic equipment (such as the terminal equipment or server in FIG. 1) 400 suitable for implementing the embodiments of the present application. The terminal equipment in the embodiment of the present application may include, but is not limited to, a mobile terminal (such as a mobile phone, a notebook computer, a digital broadcast receiver, a PDA (Personal Digital Assistant), a PAD (Tablet Computer), a PMP (Portable Multimedia Player), vehicle terminal (such as car navigation terminals) etc.) and fixed terminals (such as digital TVs, desktop computers, etc.). The electronic equipment shown in FIG. 4 is only an example, and should not impose any limitation on the functions and scope of use of the embodiments of the present application.

As shown in FIG. 4, the electronic equipment 400 may include a processing device (such as a central processing unit, a graphics processor, etc.) 401, which may perform various appropriate actions and processes according to programs stored in a read-only memory (ROM) 402 or programs loaded from the storage device 408 into a random access memory (RAM) 403. In the RAM 403, various programs and data necessary for the operation of the electronic equipment 400 are also stored. The processing equipment 401, ROM 402, and RAM 403 are connected to each other through a bus 404. An input/output (I/O) interface 405 is also connected to the bus 404.

Generally, the following devices may be connected to the I/O interface 405: an input equipment 406 including, for example, a touch screen, a touch pad, a keyboard, a mouse, a camera, a microphone, an accelerometer, a gyroscope, and the like; an output equipment 407 including, for example, a liquid crystal display (LCD), a speaker, a vibrator, and the like; a storage equipment 408 including, for example, a magnetic tape, a hard disk, and the like; and a communication equipment 409. The communication device 409 may allow the electronic equipment 400 to perform wireless or wired communication with other devices to exchange data. Although FIG. 4 shows the electronic equipment 400 having various devices, it should be understood that it is not required to implement or have all the devices shown. Alternatively, the electronic equipment 400 with more or less devices may also be implemented or provided.

In particular, the processes described above with reference to the flowcharts may be implemented as a computer software program according to an embodiment of the present disclosure. For example, an embodiment of the present disclosure includes a computer program product comprising a computer program loaded on a computer-readable medium, and the computer program contains program codes for executing the method shown in the flowchart. In such embodiments, the computer program may be downloaded and installed from the network through the communication equipment 409, or installed from the storage equipment 408, or installed from the ROM 402. When the computer program is executed by the processing device 401, the above functions defined in the method of the embodiments of the present disclosure are executed.

It should be noted that the above computer-readable medium of the present disclosure may be a computer-readable signal medium or a computer-readable storage medium or any combination of the above two. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to, an electrical connection having one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, a computer-readable storage medium may be any tangible medium that may contain or store programs, which may be used by or in connection with an instruction execution system, apparatus, or device. In the present disclosure, a computer-readable signal medium may include a data signal that is propagated in the baseband or propagated as part of a carrier, carrying computer-readable program codes. Such propagated data signals may take various forms, which includes, but is not limited to, electromagnetic signals, optical signals, or any suitable combination of the above. The computer-readable signal medium may also be any computer-readable medium other than the computer-readable storage medium, which may transmit, propagate, or transport a program for use by or in connection with the instruction execution system, apparatus, or device. The program code contained on the computer-readable medium may be transmitted using any suitable medium including, but not limited to, wires, optical cables, RF (radio frequency) and the like, or any suitable combination of the above.

The computer-readable medium may be included in the electronic device, and it may also be present separately and not assembled into the electronic device.

The computer-readable medium carries one or more programs, when the one or more programs are executed by the electronic equipment, causing the electronic equipment to: detecting whether multimedia configuration parameters have changed during a process of recording multimedia information; then recording the multimedia information based on the changed multimedia configuration parameters when detecting that the multimedia configuration parameters have changed.

Computer program codes for executing the operations of the present disclosure may be written in one or more programming languages, or combinations thereof, wherein the programming languages comprises an object-oriented programming language such as Java, Smalltalk, C++, and also includes conventional procedural programming language—such as "C" language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the drawings illustrate the architecture, function, and operation of possible implementations of systems, methods, and computer program products according to various embodiments of the present disclosure. In this regard, each block in the flowchart or block diagram may represent a module, a program segment, or a portion of code that contains one or more executable instructions for implementing the specified logical functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The above description is only a preferred embodiment of the present disclosure and a description of the principles of the applied technology. It will be understood by those skilled in the art that the scope of the disclosure to which this disclosure relates is not limited to the particular combination of the above-described technical features, and that it is also contemplated that, without departing from the above-described disclosed concept, Other technical solutions formed by any combination of the above technical features or equivalent features thereof. For example, the above features are replaced with (but not limited to) technical features with similar functions disclosed in this disclosure.

The computer-readable storage media provided by embodiments of the present application are suitable for use in any of the embodiments of the methods described above. It will not be repeated here.

It should be understood that although the steps in the flowchart of the accompanying drawings are sequentially displayed in accordance with the directions of the arrows, these steps are not necessarily performed in the order indicated by the arrows. Unless explicitly stated herein, the execution of these steps is not strictly limited, and they can be performed in other orders. Moreover, at least a part of the steps in the flowchart of the accompanying drawings may include multiple sub-steps or multiple stages. These sub-steps or stages are not necessarily performed at the same time, but may be performed at different times, and their execution order is also not necessarily performed sequentially, but may be performed in turn or alternately with other steps or at least a part of the sub-steps or stages of other steps.

The above description is only part of the implementation of the present application. It should be noted that, for those of ordinary skill in the art, without departing from the principle of the present application, several modifications and retouching can be made. These modifications and retouching should be also considered within the scope of the present application.

What is claimed is:

1. A method for processing multimedia information, comprising:
    recording multimedia information based on a track selected by a user and at least one parameter selected by the user, wherein the track comprises song information and lyrics information, wherein the multimedia information comprises the song information of the track, the lyrics information of the track, audio information corresponding to the track and input by the user, and a video captured by the user, wherein the multimedia information is recorded through a single client corresponding to the user, wherein the at least one parameter is selected through the single client, wherein the multimedia information is automatically processed based on the at least one parameter during a process of recording the multimedia information, and wherein automatically processing the multimedia information based on the at least one parameter during a process of recording the multimedia information further comprises processing the video captured by the user based on the at least one parameter during the process of recording the multimedia information;
    receiving user input during the process of recording the multimedia information;
    determining whether the at least one parameter is changed during the process of recording the multimedia information based on the user input; and
    recording a subsequent part of the multimedia information based on the changed at least one parameter in response to a determination that the at least one parameter is changed during the process of recording the multimedia information.

2. The method for processing multimedia information according to claim 1, wherein the at least one parameter comprises at least one of a mode of playing the track, a mode of mixing audio information, a parameter associated with facial features, a parameter associated with limb features, a parameter associated with filter information, or a parameter associated with a background environment.

3. The method for processing multimedia information according to claim 2, wherein the mode of playing the track comprises an accompaniment mode, an original vocal mode, or an earphone monitor mode.

4. The method for processing multimedia information according to claim 2, wherein the mode of mixing audio information comprises a rock mode, a folk mode, a classical mode, a country mode, a jazz mode, a popular mode, or a hip-hop mode.

5. The method for processing multimedia information according to claim 2, wherein before the recording multimedia information based on a track selected by a user and at least one parameter selected by the user, the method further comprises:
receiving a first instruction of editing the lyrics information from the user; and
editing the lyrics information based on the first instruction.

6. The method according to claim 5, further comprising:
recording the multimedia information based on the edited lyrics information and song information corresponding to the edited lyrics information.

7. The method for processing multimedia information according to claim 2, wherein the video captured by the user is processed based on at least one of the parameter associated with facial features, the parameter associated with limb features, the parameter associated with filter information, or the parameter associated with a background environment.

8. The method for processing multimedia information according to claim 1, wherein after the recording a subsequent part of the multimedia information based on the changed at least one parameter, the method further comprises:
receiving a second instruction of editing the recorded multimedia information from the user; and
editing the recorded multimedia information based on the second instruction.

9. The method according to claim 1, wherein the recorded multimedia information is a music video.

10. An electronic equipment comprising a processor and a memory storing computer program, wherein the computer program, when executed, causes the processor to implement operations comprising:
recording multimedia information based on a track selected by a user and at least one parameter selected by the user, wherein the track comprises song information and lyrics information, wherein the multimedia information comprises the song information of the track, the lyrics information of the track, audio information corresponding to the track and input by the user, and a video captured by the user, wherein the multimedia information is recorded through a single client corresponding to the user, wherein the at least one parameter is selected through the single client, wherein the multimedia information is automatically processed based on the at least one parameter during a process of recording the multimedia information, and wherein automatically processing the multimedia information based on the at least one parameter during a process of recording the multimedia information further comprises processing the video captured by the user based on the at least one parameter during the process of recording the multimedia information;
receiving user input during the process of recording the multimedia information;
determining whether the at least one parameter is changed during the process of recording the multimedia information based on the user input; and
recording a subsequent part of multimedia information based on the changed at least one parameter in response to a determination that the at least one parameter is changed during the process of recording the multimedia information.

11. The electronic equipment according to claim 10, the operations further comprising:
receiving an instruction of editing the lyrics information from the user;
processing the lyrics information based on the instruction; and
recording the multimedia information based on the edited lyrics information and song information corresponding to the edited lyrics information.

12. The electronic equipment according to claim 10, wherein the at least one parameter comprises at least one of a mode of playing the track, a mode of mixing audio information, a parameter associated with facial features, a parameter associated with limb features, a parameter associated with filter information, or a parameter associated with a background environment.

13. The electronic equipment according to claim 12, wherein the video captured by the user is processed based on at least one of the parameter associated with facial features, the parameter associated with limb features, the parameter associated with filter information, or the parameter associated with a background environment.

14. A non-transitory computer-readable storage medium storing computer program, wherein the computer program, when executed, causes a computer to implement a method for processing multimedia information, wherein the method includes:
recording multimedia information based on a track selected by a user and at least one parameter selected by the user, wherein the track comprises song information and lyrics information, wherein the multimedia information comprises the song information of the track, the lyrics information of the track, audio information corresponding to the track and input by the user, and a video captured by the user, wherein the multimedia information is recorded through a single client corresponding to the user, wherein the at least one parameter is selected through the single client, wherein the multimedia information is automatically processed based on the at least one parameter during a process of recording the multimedia information, and wherein automatically processing the multimedia information based on the at least one parameter during a process of recording the multimedia information further comprises processing the video captured by the user based on the at least one parameter during the process of recording the multimedia information;
receiving user input during the process of recording the multimedia information;
determining whether the at least one parameter is changed during the process of recording the multimedia information based on the user input; and
recording a subsequent part of the multimedia information based on the changed at least one parameter in response to a determination that the at least one parameter is changed during the process of recording the multimedia information.

15. The non-transitory computer-readable storage medium according to claim 14, wherein the at least one parameter comprises at least one of a mode of playing the track, a mode of mixing audio information, a parameter associated with facial features, a parameter associated with limb features, a parameter associated with filter information, or a parameter associated with a background environment.

16. The non-transitory computer-readable storage medium according to claim 15, wherein the mode of playing the track comprises an accompaniment mode, an original vocal mode, or an earphone monitor mode.

17. The non-transitory computer-readable storage medium according to claim 15, wherein the mode of mixing audio information comprises a rock mode, a folk mode, a classical mode, a country mode, a jazz mode, a popular mode, a hip-hop mode.

18. The non-transitory computer-readable storage medium according to claim 15, wherein the video captured by the user is processed based on at least one of the parameter associated with facial features, the parameter associated with limb features, the parameter associated with filter information, or the parameter associated with a background environment.

19. The non-transitory computer-readable storage medium according to claim 14, wherein before the recording multimedia information based on a track selected by a user and at least one parameter selected by the user, the method further comprises:

receiving a first instruction of editing the lyrics information from the user; and editing the lyrics information based on the first instruction.

20. The non-transitory computer-readable storage medium according to claim 14, wherein after the recording a subsequent part of the multimedia information based on the changed at least one parameter, the method further comprises:

receiving a second instruction of editing the recorded multimedia information from the user; and editing the recorded multimedia information based on the second instruction.

* * * * *